Aug. 22, 1933.  W. F. HUGHES  1,923,438
FRICTION CLUTCH
Filed April 18, 1931   2 Sheets-Sheet 1

Inventor
William F. Hughes
By Wilson, Dowell,
McCanna & Rehm
Attys.

Aug. 22, 1933.  W. F. HUGHES  1,923,438
FRICTION CLUTCH
Filed April 18, 1931  2 Sheets-Sheet 2

Inventor
By William F. Hughes
Wilson, Dowell, McCanna & Lehr
Attys.

Patented Aug. 22, 1933

1,923,438

UNITED STATES PATENT OFFICE 1,923,438

FRICTION CLUTCH

William F. Hughes, Rockford, Ill., assignor to Rockford Drilling Machine Co., Rockford, Ill., a Corporation of Illinois Application April 18, 1931. Serial No. 531,126

16 Claims. (Cl. 192—68)

This invention relates to friction clutches generally, but has more particular reference to an over center type of clutch especially adapted for use on tractors, or for any similar heavy duty purpose.

My invention has for its general object improvements in the design and construction of a clutch of this kind with a view to economy, and easy assembling, as well as greater serviceability, ease and accuracy in adjustment, and generally improved performance.

More specifically stated, this clutch, in accordance with one phase of my invention, has an extremely simple form of cam means for effecting positive engagement of the clutch, and spring means also of simple form tending normally toward disengagement of the clutch to relieve the clutch of any tendency for drag when the cam means is operated for disengagement of the clutch.

Another important feature of this clutch lies in the provision of adjustable screws in the back plate which have ball ends providing abutments for the cams previously referred to, whereby to accurately determine the engagement of the clutch by the cams at all points circumferentially of the clutch disc, and the provision in connection with these screws of a single means connecting all of the screws in series for simultaneous, uniform adjustment, thus simplifying the matter of making the adjustment and insuring that all of the screws are adjusted accurately to the same extent, and permitting the locking of all of the screws in adjusted position by means of a single lock.

The invention is illustrated in the accompanying drawings, in which—

The same reference numerals are applied to corresponding parts in the three views.

Figure 1:
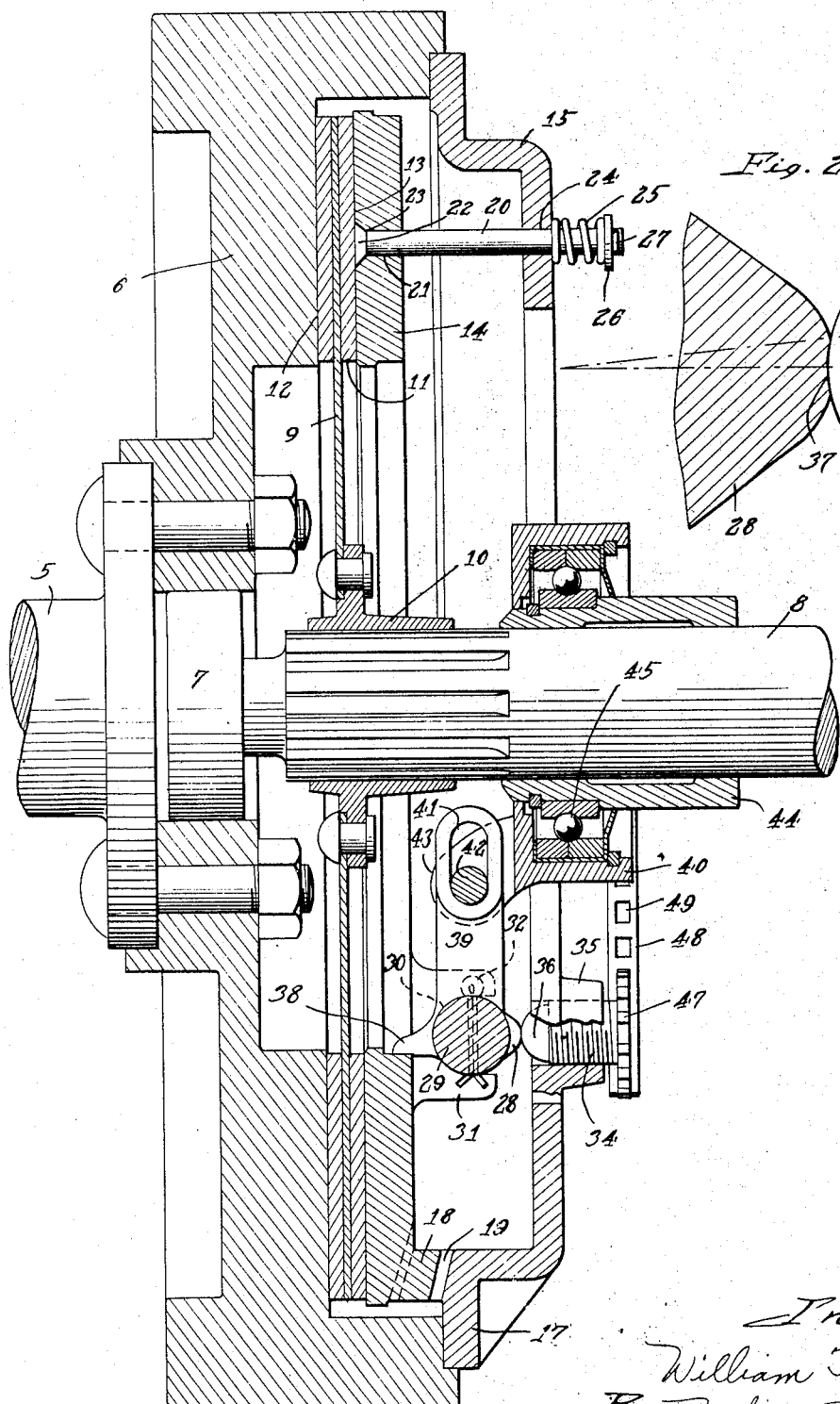
Figure 1 is a longitudinal section in the plane of the broken line 1—1 of Fig. 3 of a clutch made in accordance with my invention, the same being shown engaged.

The end portion of the crank shaft of the engine appears at 5 in Figure 1, and has the flywheel 6 mounted thereon as shown. A pilot bearing 7 at the center of the flywheel supports the front end of the driven shaft 8 which extends rearwardly from the flywheel and clutch into the gear box of the transmission in the usual way. 9 is the clutch disc, the center hub 10 of which is splined on the front end of the shaft 8 to transmit drive from the flywheel to the shaft when the clutch is engaged. The usual pads or facings 11 are provided on the marginal portion of the disc on opposite sides thereof for engagement with the driving face 12 on the back of the flywheel and the driving face 13 on the front of the pressure plate 14. The latter is suitably cast like the flywheel, and the faces 12 and 13 are accurately machined on these parts for smooth engagement of the clutch. The back plate 15 is preferably cast to the dished form shown to provide the necessary space between it and the pressure plate for the engaging cams hereinafter described, and is fastened to the rim of the flywheel by bolts entered through holes 16 in the flanged marginal portion 17 of the back plate.

The pressure plate 14 has a plurality of equally circumferentially spaced lugs 18 suitably cast integral therewith and projecting rearwardly therefrom. These lugs have the side faces thereof machined smooth for sliding reception in guides 19 provided on the front of the back plate 15, whereby to make the pressure plate turn with the flywheel but allow for movement of said plate toward and away from the driving face 12 for engagement and disengagement of the clutch. Pins 20 extend rearwardly through holes 21 provided in the pressure plate at equally circumferentially spaced points and have tapered heads 22 on the inner ends thereof for reception in the corresponding counterbores 23 provided in the pressure plate, whereby to permit the pressure plate to be retracted by means of the pins. The pins extend through holes 24 in the back plate and have small coiled compression springs 25 fitting over the projecting ends thereof in abutment with the back of the back plate and retained on the pins by washers 26 and cotter pins 27. When the clutch is disengaged in the manner hereinafter described, the springs 25 move the pressure plate 14 away from the driving face 12 of the flywheel to allow the flywheel to turn independently of the clutch disc 9. This retracting movement of the pressure plate is limited by the back plate at 18—19. In the engagement of the clutch in the manner hereinafter described, the pressure plate 14 is moved positively toward the driving face 12 of the flywheel to grip the marginal padded portion 11 of the clutch disc 9 between the faces 12 and 13. Obviously, in this movement of the pressure plate, the springs 25 are compressed and this insures immediate disengagement of the clutch when the engaging cams are subsequently operated for disengagement of the clutch as hereinafter described.

The positive engagement of the clutch is secured by the simultaneous, like operation of four cams 28 disposed at equally circumferentially spaced points with respect to the pressure plate 14. These cams are provided on the opposite ends of two parallel shafts 29 disposed in a plane at right angles to the shaft 8 and equally spaced on either side thereof, as clearly appears in Fig. 3. The shafts 29 have their ends received with a close working fit in bearings 30 formed as open recesses in lugs 31 suitably cast integral with and projecting from the back of the pressure plate. The cams 28 are suitably formed integral with the shafts 29 and constitute only slight projections on the ends of the shafts as appears in Figure 1. The shafts are arranged to have such a small amount of oscillatory movement as hereinafter appears that the cams 28 do not interfere with the oscillation of said shafts in the bearings 30. Cotter pins 32 are entered in holes 33 in the ends of the shafts 29 and serve by abutment with the lugs 31 to hold the shafts against endwise movement in the bearings 30. Now, four screws 34 are threaded in bosses 35 provided on the back plate 15 and have ball-shaped inner ends 36 for abutment with the centers of the cams 28. When the shafts 29 are turned to bring the noses of the cams 28 in abutment with the ball ends 36 of the screws 34, as appears in Figure 1, the clutch is positively engaged, the padded marginal portion 11 of the disc 9 being firmly clamped between the faces 12 and 13. A slight dip is formed in the nose of each cam, as appears at 37 in Fig. 2, to receive the ball end 36 of the screw cooperating therewith and thus determine the relationship of the parts for the engagement of the clutch. Lugs 38 are also provided on the shafts 29 at the middle thereof for engagement with the inner edge of the pressure plate 14 to limit the turning of the shafts and prevent the cams 28 from being turned past the position illustrated in Fig. 2. Levers 39 are also provided on the shafts 29 at the middle thereof and substantially at right angles to the lugs 38 and projecting substantially radially inwardly relative to the shaft 8 for connection with a throw-out collar 40 mounted on said shaft. The inner ends of the levers 39 are slotted as at 41 to slidably receive pins 42 mounted in forks 43 projecting forwardly from and suitably formed integral with the collar 40. The collar 40 is mounted on a sleeve 44 by means of an anti-friction ball bearing 45, and the sleeve 44 has trunnions 46 projecting from opposite sides thereof in a horizontal plane, as appears in Fig. 3, for cooperation with a yoke or other suitable clutch operating means.

Figure 2:
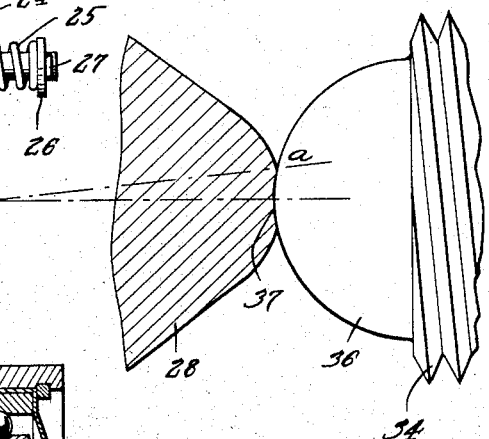
Fig. 2 is an enlarged sectional detail of one of the cams showing how the ball end of the screw is arranged to cooperate therewith.
Figure 3:
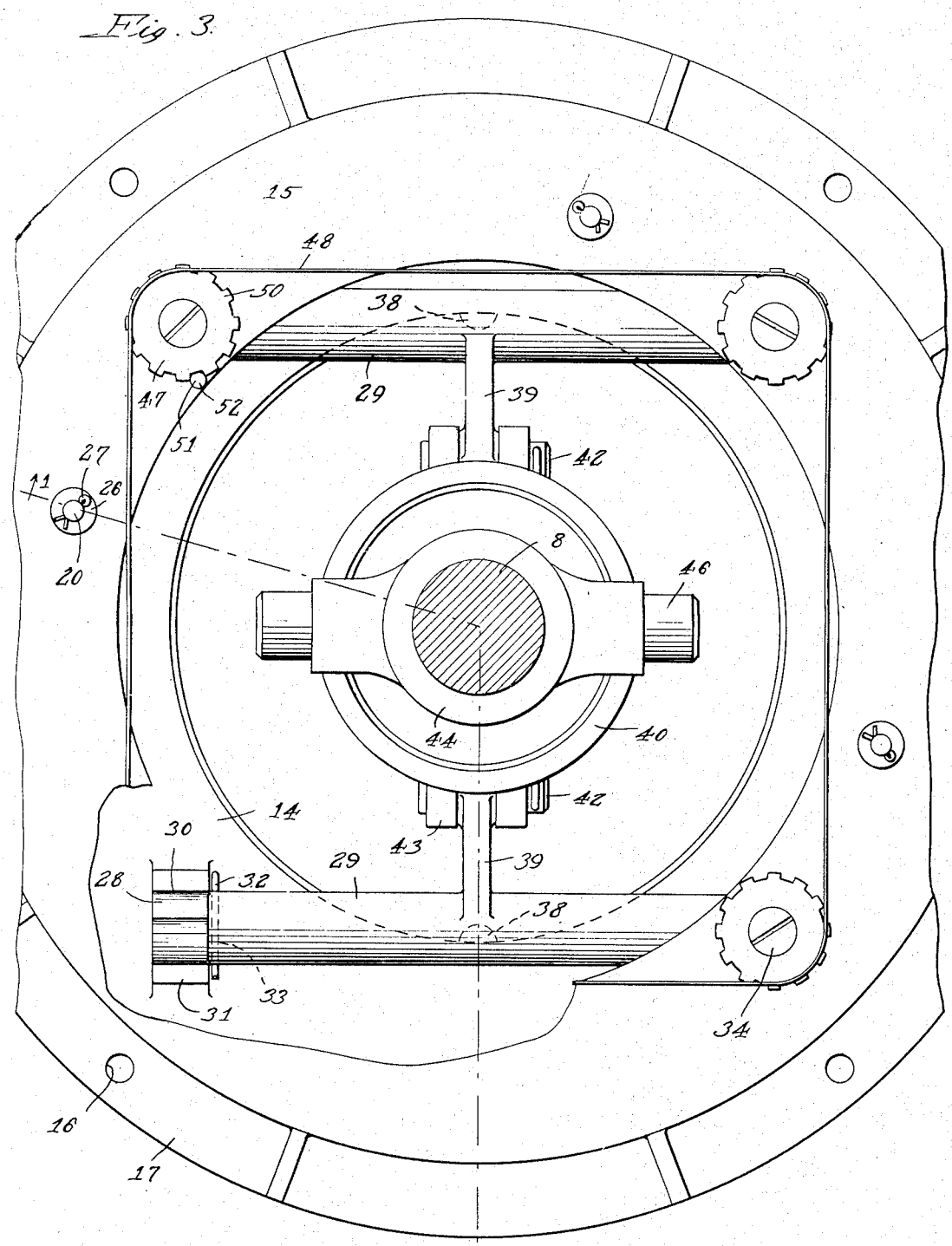
Fig. 3 is a rear view of Figure 1 with portions thereof broken away.

In operation, when the throw-out collar 40 is moved forwardly, the levers 39 turn the shafts 29 and, hence, the cams 28, to positively engage the clutch as the cams ride onto the ball ends 36 of the screws 34. Just prior to engagement of the lugs 38 with the pressure plate 14, the cams 28 have their high points *a* riding on the ball ends 36 of the screws 34. The parts may then be said to be "on center", that being the point in an over center clutch when the pressure plate is at the limit of its movement toward engagement of the clutch. Very slight additional angular movement of the cams 28 past or over center results in the cams assuming the relationship to the ball ends 36 of the screws 34 shown in Fig. 2, in which the ball ends are engaged in the dips 37 on the cams 28. There is a slight relaxing of pressure of the pressure plate 14 on the clutch disc 9, but to an infinitesimal extent and not enough to affect the transmission of power from the flywheel to the clutch disc. The pads 11 are compressible to such an extent that the cams 28 can be turned over center in the manner described and still hold the clutch positively engaged. When the cams 28 are disposed, as shown in Fig. 2, the lugs 38 prevent further turning of the shafts 29 by the levers 39. Manifestly, there is considerable pressure brought to bear on the ball ends 36 of the screws 34 by reason of the compression of the pads 11 and springs 25 and when the cams 28 have been moved over center as just described, this pressure tends to keep the cams in that position and prevent accidental disengagement of the clutch. In other words, it requires an appreciable force exerted on the the throw-out collar 40 to release the clutch once the same has been engaged. On the other hand, after the clutch has been disengaged, the springs 25 hold the pressure plate in retracted position, and it takes an appreciable force to overcome the action of these springs to engage the clutch. The clutch is, therefore, actually held disengaged under the pressure of the same springs 25 that otherwise serve to hold the clutch engaged, or at least resist its disengagement. This feature is of considerable advantage on a tractor because the operator can make an adjustment of the implement being drawn by the tractor without keeping his foot on the clutch pedal or otherwise holding the clutch disengaged. Frequently, serious accidents result when the operator accidentally releases his hold on the clutch pedal while some change is being made on the implement. The clutch is obviously of simple and inexpensive construction and can be installed quickly and easily.

The screws 34 providing the abutments for the cams 28 are arranged to be adjusted to enable the desired positive engagement of the clutch regardless of wear of the pads 11 in service. In order that the adjustment of the screws may be uniform, I contemplate having pinions 47 mounted on the outer ends of the screws and interconnected in series so that whatever adjustment is given one screw will be given all of the others. Now, of course, there are various ways of interconnecting the pinions for such adjustment of the screws. For example, a single ring gear could be provided meshing with all of the pinions. However, for the sake of economy and lightness, I prefer to provide an endless flexible steel band 48 perforated, as indicated at 49, to receive the cogs 50 of the pinions to provide in effect an intermeshing rack and pinion for each of the screws. A pin 51, arranged to be pressed or driven into a hole 52 of the back plate, is suitably provided to lock one of the pinions 47 against turning after adjustment, and it is evident that this one lock serves to lock all of the screws in adjusted position. Obviously, the lock could be provided in connection with the band 48 to obtain the same result. In operation, the pin 51 is removed to permit turning the screws 34 to permit the desired engagement of the clutch, and after the desired adjustment of the screws has been made, the pin is replaced to keep that adjustment.

I claim:

1. In a friction clutch, the combination with a flywheel, serving as the driving element, and a clutch disc, serving as the driven element, of a back plate for the flywheel, a pressure plate guided for movement toward and away from the back plate for disengagement and engagement of the clutch, respectively, a rock shaft disposed between said plates and supported on one of them for oscillation, cams on the ends of said shaft arranged in the turning thereof to ride on abutments provided therefor on the other plate, and manually operable means substantially midway of the ends of the shaft for rocking said shaft to positively engage the clutch.

2. In a friction clutch, the combination with a flywheel, serving as the driving element, and a clutch disc, serving as the driven element, of a back plate for the flywheel, a pressure plate guided for movement toward and away from the back plate for disengagement and engagement of the clutch, respectively, a rock shaft supported for oscillation on the back of the pressure plate, cams on the ends of said shaft arranged in the turning thereof to ride on abutments provided therefor on the back plate, and manually operable means substantially midway of the ends of the shaft for rocking said shaft.

3. In a friction clutch, the combination with a flywheel, serving as the driving element, and a clutch disc, serving as the driven element, of a back plate for the flywheel, a pressure plate movable toward and away from the back plate for disengagement and engagement of the clutch, respectively, one or more cams supported for oscillation on the back of the pressure plate and arranged to ride on abutments provided therefor on the back plate, and manually operable means for operating said cams, each of said cams being formed with a round nose portion and the abutments therefor being ball shaped, the said cams being formed with a dip in the high point thereof for entry therein of the ball portion of the abutment in an over center position of the cam, whereby to hold the clutch in engaged condition.

4. In a friction clutch, the combination with a flywheel, serving as the driving element, and a clutch disc, serving as the driven element, of a back plate for the flywheel, a pressure plate guided for movement toward and away from the back plate for disengagement and engagement of the clutch, respectively, a pair of parallel rock shafts supported on the back of the pressure plate for oscillatory movement and disposed the same distance to either side of the axis of rotation, cams on said shafts disposed in substantially equally circumferentially spaced relation with respect to the clutch disc and flywheel, means for simultaneously rocking said shafts to like degrees whereby to correspondingly turn said cams, and a plurality of abutments threadedly mounted on the back plate for adjustment relative to said cams.

5. A clutch as set forth in claim 4 wherein each of said cams is formed with a round nose portion and wherein the abutments therefor are ball shaped, the said cams being formed with a dip in the high point thereof for entry therein of the ball portion of the abutment in an over center position of the cam, whereby to hold the clutch in engaged condition.

6. A clutch as set forth in claim 4 including means whereby said abutments are interconnected for simultaneous like adjustment.

7. A clutch as set forth in claim 4 including means whereby said abutments are interconnected for simultaneous like adjustment, and means whereby all of said abutments are arranged to be locked in adjusted position.

8. A clutch as set forth in claim 4 including means for limiting the rocking of said shafts when the cams thereof are in position for full engagement of the clutch.

9. In a friction clutch, the combination with a flywheel, serving as the driving element, and a clutch disc, serving as the driven element, of a back plate for the flywheel, a pressure plate movable toward and away from the back plate for disengagement and engagement of the clutch, respectively, one or more cams disposed between said plates and supported on one of them for oscillation and arranged in the turning thereof to ride on abutments provided therefor on the other plate, and manually operable means for operating said cams, each of said cams being formed with a round nose portion and the abutments therefor being ball shaped, the said cams being formed with a dip in the high point thereof for entry therein of the ball portion of the abutment in an over center position of the cam, whereby to hold the clutch in engaged condition.

10. In a friction clutch, the combination with a flywheel, serving as the driving element, and a clutch disc, serving as the driven element, of a back plate for the flywheel, a pressure plate guided for movement toward and away from the back plate for disengagement and engagement of the clutch, respectively, a pair of parallel rock shafts supported on the back of the pressure plate for oscillatory movement and disposed the same distance to either side of the axis of rotation, cams on said shafts disposed in substantially equally circumferentially spaced relation with respect to the clutch disc and flywheel, means for simultaneously rocking said shafts to like degrees whereby to correspondingly turn said cams, and abutment means threadedly mounted on the back plate for adjustment relative to said cams.

11. In a friction clutch, the combination with a flywheel, serving as the driving element, and a clutch disc, serving as the driven element, of a back plate for the flywheel, a pressure plate guided for movement toward and away from the back plate for disengagement and engagement of the clutch, respectively, a plurality of shafts of equal lengths disposed equi-distant from the axis of rotation of the clutch and supported on the back of the pressure plate for oscillatory movement, cams on said shafts in circumferentially spaced relation with respect to the clutch disc and flywheel, means for simultaneously rocking said shafts to like degrees, whereby to correspondingly turn said cams, and abutment means mounted on the back plate for adjustment relative to said cams.

12. A clutch as set forth in claim 11 wherein each of said cams is formed with a round nose portion and wherein the abutments therefor are ball shaped, the said cams being formed with a dip in the high point thereof for entry therein of the ball portion of the abutment in an over center position of the cam, whereby to hold the clutch in engaged condition.

13. In a friction clutch, the combination with a flywheel constituting the driving element and a clutch disc constituting the driven element, of a back plate on the flywheel, a pressure plate, means guiding the pressure plate for movement toward and away from the back plate for disengagement and engagement of the clutch respectively, a plurality of cams mounted on the pressure plate facing the back plate, abutment means mounted on the back plate for adjustment relative to said cams to predetermine the movement of the pressure plate for a given operation of the cams, manually operable means for operating the cams to effect positive engagement of the clutch, all of said cams being round nosed and arranged to have sliding engagement with the abutment means, and means for limiting the turning of the cams whereby the same are substantially on dead center when given extreme movement.

14. A clutch as set forth in claim 13 wherein the last mentioned means comprises projections turning with the cams and arranged to come into engagement with a stop surface on the pressure plate.

15. In a friction clutch, the combination with a flywheel constituting the driving element and a clutch disc constituting the driven element, of a back plate on the flywheel, a pressure plate, means guiding the pressure plate for movement toward and away from the back plate for disengagement and engagement of the clutch respectively, a plurality of rock shafts of equal lengths supported on the back of the pressure plate for oscillatory movement and disposed the same distance from the axis of rotation and in such relation to one another as to maintain dynamic balance in said pressure plate, cams on said shafts disposed in substantially equally circumferentially spaced relation with respect to the clutch disc and flywheel whereby further to maintain dynamic balance in the pressure plate and also secure uniform engagement of the clutch, means for simultaneously rocking said shafts to like degrees whereby to correspondingly turn said cams, and abutment means on the back plate for engagement by said cams.

16. A clutch as set forth in claim 15 including means for limiting the rocking of said shafts when the cams thereof are in position for substantially full engagement of the clutch.

WILLIAM F. HUGHES.